United States Patent [19]

Christophliemk et al.

[11] 4,267,158
[45] May 12, 1981

[54] CONTINUOUS PROCESS FOR THE PRODUCTION OF AMORPHOUSE SODIUM ALUMINOSILICATE

[75] Inventors: Peter Christophliemk, Dusseldorf; Willi Wüst, Ratingen-Hoesel; Franz-Josef Carduck, Haan, all of Fed. Rep. of Germany

[73] Assignees: Henkel Kommanditgesellschaft auf Aktien, Dusseldorf; Deutsche Gold-und Silber-Scheideanstalt Vormals Roessler, Frankfurt am Main, both of Fed. Rep. of Germany

[21] Appl. No.: 127,382

[22] Filed: Mar. 5, 1980

[30] Foreign Application Priority Data

Mar. 15, 1979 [DE] Fed. Rep. of Germany ....... 2910147

[51] Int. Cl.$^3$ ..................... C01B 33/26; C01B 33/28
[52] U.S. Cl. ................................ 423/329; 106/288 B; 423/328
[58] Field of Search .................. 423/329, 328, 330; 106/288 B

[56] References Cited

U.S. PATENT DOCUMENTS

| | | | |
|---|---|---|---|
| 2,882,243 | 4/1959 | Milton | 423/328 |
| 2,904,607 | 9/1959 | Mattox et al. | 423/328 X |
| 4,041,135 | 9/1977 | Williams et al. | 423/329 |
| 4,071,377 | 1/1979 | Schwuger et al. | 423/329 X |
| 4,073,867 | 2/1978 | Roebke et al. | 423/329 |
| 4,213,874 | 7/1980 | Williams et al. | 423/329 X |

*Primary Examiner*—Edward J. Meros

*Attorney, Agent, or Firm*—Hammond & Littell, Weissenberger and Muserlian

[57] ABSTRACT

A process for the continuous production of an aqueous, alkaline suspension of x-ray amorphous sodium aluminosilicate having a small particle size of at least 99% by volume of a particle size of less than 50μ, suitable for conversion into zeolite sodium aluminosilicate of the smallest particle sizes, by mixing an aqueous sodium aluminate solution with an aqueous sodium slicate solution in the presence of excess sodium hydroxide solution at a temperature in the range of from 20° to 103° C., where the solutions being mixed have a mathematical total molar ratio of:

1.5 to 9 $Na_2O$:1 $Al_2O_3$:1 to 7 $SiO_2$:40 to 400 $H_2O$ consisting essentially of the steps of continuously passing one of said two aqueous solutions into the first zone of a progressively, separately zoned mixing area, continuously splitting the other aqueous solution into at least three partial streams, continuously passing the first of said partial streams into said first zone, continuously passing the mixed contents of said first zone into the second zone of a progressively, separately zoned mixing area, continuously passing the remainder of said partial streams separately into downstream zones of said progressively, separately zoned mixing area, where said mean holding time of the reaction mixture in each of said separately zoned mixing areas is at least 5 seconds and sufficient to effect substantial mixing of said contents.

12 Claims, 7 Drawing Figures

CONTINUOUS PROCESS FOR THE PRODUCTION OF AMORPHOUSE SODIUM ALUMINOSILICATE

BACKGROUND OF THE INVENTION

The subject of the invention is a process for the continuous preparation of x-ray amorphous sodium aluminosilicates of small particle size, capable of conversion into zeolitic sodium aluminosilicates of smallest particle size, by mixing an aqueous sodium aluminate solution with an aqueous sodium silicate solution in the presence of excess sodium hydroxide solution above room temperature.

On mixing sodium aluminate solutions with sodium silicate solutions under the mentioned conditions, particularly at temperatures above 60° C., a precipitate of x-ray amorphous sodium aluminosilicate is formed instantaneously at all starting and concentration levels of the reaction partners commonly used in the technology. Of technological significance is especially the mixing solutions which give the following molar ratios of the reaction partners:

1.5 to 9$Na_2O$:1$Al_2O_3$:1 to 7 $SiO_2$:40 to 400 $H_2O$.

An alkalinity exceeding this, a higher silicate content or a greater dilution of the precipitation batch are not teachnologically meaningful. A water content of the batch lower than that given above results in especially pronounced formation of lumps in the precipitate as well as in non-homogeneous products.

Within the mentioned batch ratios, an amorphous sodium aluminosilicate precipitates always primarily from a large excess of sodium hydroxide solution, which precipitate has a chemical composition corresponding to the molar ratios of:

1 to 5$Na_2O$:1$Al_2O_3$:1.8 to 4 $SiO_2$.

After rinsing out the excess alkali, x-ray amorphous products are obtained with a chemical composition corresponding to the molar ratios of:

0.9 to 1.1$Na_2O$:1 $Al_2O_3$:1.8 to 4 $SiO_2$ with a moisture content depending on the degree of drying. The silicate content of the precipitate depends largely on the molar ratio of $SiO_2$:$Al_2O_3$ in the precipitation batch.

The instantaneously forming precipitates of amorphous sodium aluminosilicate upon mixing of aluminate solutions with silicate solutions above room temperature lead to the formation of a gel-like reaction mixture that has no fluidity at first. This, on the one hand, makes a thorough and complete mixing of the two reaction components and thus also the obtaining of a homogeneous reaction product difficult and, on the other hand, delays also a subsequent crystallization of the amorphous product, if this is desired. Beyond this, the effect causes the formation of a relatively coarse-grained product containing large proportions with a particle diameter exceeding 50μ. With a batch precipitation of sodium aluminosilicate, the no longer fluid reaction mixture usually can be liquefied again by a sufficiently long application of strong shear forces. Until now, however, a continuous precipitation of amorphous sodium aluminosilicate was made impossible by the brief available time, due to the continuous process at technologically significant rates, which was inadequate to break up or crush the non-fluid reaction mixture sufficiently to reliquefy it.

OBJECTS OF THE INVENTION

An object of the present invention is the development of a continuous process for the production of an aqueous, alkaline suspension of an x-ray amorphous sodium aluminosilicate having a small particle size of at least 99% by volume of a particle size of less than 50μ.

Another object of the present invention is the development of a process for the preparation of amorphous sodium aluminosilicates that makes a continuous process with a high volume/time yield possible, even without the use of strong shear forces, with which the above-mentioned disadvantages can be avoided.

A further object of the present invention is the development of a process for the continuous production of an aqueous, alkaline suspension of x-ray amorphous sodium aluminosilicate having a small particle size of at least 99% by volume of a particle size of less than 50μ, suitable for conversion into zeolite sodium aluminosilicate of the smallest particle sizes, by mixing an aqueous sodium aluminate solution with an aqueous sodium silicate solution in the presence of excess sodium hydroxide solution at a temperature in the range of from 20° to 103° C., where the solutions being mixed have a mathematical total molar ratio of:

1.5 to 9$Na_2O$:1$Al_2O_3$:1 to 7 $SiO_2$:40 to 400 $H_2O$ consisting essentially of the steps of continuously passing one of said two aqueous solutions into the first zone of a progressively, separately zoned mixing area, continuously splitting the other aqueous solution into at least three partial streams, continuously passing the first of said partial streams into said first zone, continuously passing the mixed contents of said first zone into the second zone of a progressively, separately zoned mixing area, continuously passing the remainder of said partial streams separately into downstream zones of said progressively, separately zoned mixing area, where said mean holding time of the reaction mixture in each of said separately zoned mixing areas is at least 5 seconds and sufficient to effect substantial mixing of said contents.

These and other objects of the invention will become apparent as the description thereof proceeds.

DESCRIPTION OF THE INVENTION

The subject of the invention is a process for the continuous preparation of an aqueous, alkaline suspension of x-ray amorphous sodium aluminosilicates of fine particle size that contain at least 99% by volume of a particle size of less than 50μ, which can be converted into zeolitic sodium aluminosilicates of smallest particle size, by mixing an aqueous sodium aluminate solution with an aqueous sodium silicate solution in the presence of excess sodium hyroxide solution at temperatures in the range of 20° C. to 103° C., with the two solutions to be mixed having a mathematical total composition with respect to the molar ratios, of:

1.5 to 9$Na_2O$:1$Al_2O$:1 to 7 $SiO_2$:40 to 400 $H_2O$, which is characterized in that one of the two reaction components is added in a continuous stream into a mixing apparatus with a stage effect, and the other or second reaction component, divided into three or more partial streams the total dosage of which is predetermined by the mathematical total composition of the two solutions, is mixed with the first reaction component, the first partials stream being added immediately, continuously to the first reaction component, and the other partial streams being dosed, also continuously, but downstream, into the stream of the formed reaction mixture, always after a mean holding time of the reaction partners in the stage of the mixing apparatus of at least 5 seconds.

More particularly, the present invention involves a process for the continuous production of an aqueous, alkaline suspension of x-ray amorphous sodium aluminosilicate having a small particle size of least 99% by volume of a particle size of less than 50μ, suitable for conversion into zeolite sodium aluminosilicate of the smallest particle sizes, by mixing an aqueous sodium aluminate solution with an aqueous sodium silicate solution in the presence of excess sodium hydroxide solution at a temperature in the range of from 20° to 103° C., where the solutions being mixed have a mathematical total molar ratio of:

1.5 to 9$Na_2O$:1$Al_2O_3$:1 to 7 $SiO_2$:40 to 400 $H_2O$ consisting essentially of the steps of continuously passing one of said two aqueous solutions into the first zone of a progressively, separately zoned mixing area, continuously splitting the other aqueous solution into at least three partial streams, continuously passing the first of said partial streams into said first zone, continuously passing the mixed contents of said first zone into the second zone of a progressively, separately zoned mixing area, continuously passing the remainder of said partial streams separately into downstream zones of said progressively, separately zoned mixing area, where said mean holding time of the reaction mixture in each of said separately zoned mixing areas is at least 5 seconds and sufficient to effect substantial mixing of said contents.

The dividing or splitting of the second reaction component into several partial streams, which are mixed separately from each other with the stream of the first reaction component or with the reaction mixture, is essentially important for the process of the invention. While the first reaction component flows continuously in an undivided stream into the first stage of the mixing apparatus, the second component is added continuously, simultaneously, at first only in a less than adequate amount, based on the mathematical total composition of the two solutions to be mixed, to the stream of the first reaction component, and the rest of this second reaction component is dosed continuously in several portions, in each instant with a delay in time, only into the stream of the already present reaction mixture.

A considerable extension of the precipitation time of the amorphous sodium aluminosilicate can be achieved by the splitting of one of the two reaction components in a technically simple manner; as immediate consequence of this effect, the formation of a no longer fluid reaction mixture is effectively prevented, even without the application of strong shear forces. The use of the continuous process according to the invention thus results in a properly fluid homogeneous suspension of fine, amorphous sodium aluminosilicate particles capable of crystallization, of which at least 99% by volume are smaller than 50μ.

It is to be taken into consideration that the total dosages of the two reaction partners are determined by the mathematical total composition of the solutions to be mixed.

Preferred according to the invention are precipitation batches in which the two solutions to be mixed have a mathematical total composition, with respect to the molar ratios, of from:

1.5 to 6$Na_2O$:1$Al_2O_3$:1.3 to 2.5 $SiO_2$:40 to 150 $H_2O$, especially in the range of from:

3 to 5.5$Na_2O$:1$Al_2O_3$:1.7 to 2 $SiO_2$:70 to 110 $H_2O$.

The amorphous products freed from excess alkali then exhibit a chemical composition corresponding to molar ratios of:

0.9 to 1.1$Na_2O$:1$Al_2O_3$:1.8 to 2 $SiO_2$ with a water content dependent on the degree of dryness.

On the other hand, the amorphous precipitation products still containing excess alkali are characterized by the fact that they are readily convertible into highly crystalline sodium aluminosilicates of various types. The above-mentioned preferred precipitation batches result, by crystallization of the amorphous primary product, in zeolitic molecular sieves of the NaA type, having the smallest grain size, with the proportion of granule sizes below 10μ exceeding 95% by volume and wet screening residues larger or equal to 50μ in amounts of less than 1% by weight. The chemical composition of the molecular sieve NaA, a sodium aluminosilicate of special technical significance, corresponds to the empirical formula:

1±0.2$Na_2O$·1$Al_2O_3$·2±0.2$SiO_2$·0 to 6 $H_2O$

The x-ray diffraction pattern normally used for the identification of the molecular sieve NaA is given in the German published application DE-AS No. 10 38 015 and DE-AS No. 10 38 017, for example.

As explained earlier, the splitting of one of the two reaction components into at least three partial streams and mixing them stepwise with the other reaction component in a continuous manner causes a considerable lowering of the viscosity of the reaction mixture from an initial mixing of the entirety of the two components and thus its improved fluidity. In keeping with the intent of the process according to the invention, it is of advantage here that only 40% to 60% of the latter or second reaction component, based on the ratio of the two solutions predetermined by the mathematical total composition, are added continuously in the form of the first partial stream, to the stream of the former or first reaction component. The rest of the latter or second reaction component is then advantageously dosed downstream, in two to four partial streams, into the stream of the already formed reaction mixture, with the individual partial streams containing respectively equal or smaller percentages of the latter or second reaction component, also based on the ratio of the two solutions predetermined by the mathematical total composition. A splitting into more than five partial streams requires a greater technical expense with respect to dosing, without producing marked advantages with respect to process or product. Thus the splitting of one of the two reaction components into three to five partial streams is preferred for the continuous precipitation of amorphous sodium aluminosilicate according to the invention.

Principally, either of the two components, that is, either the aluminate solution or the silicate solution, can be split into the partial streams. However, according to the invention, the splitting of the aluminate solution, as the latter or second reaction component, into partial streams is preferred since this process results in reaction products of especially small particle size.

As concerns the precipitation temperature, the mixing of the two reaction components at a temperature that is kept constant except for deviations of ±2° C., preferably in the range of from 50° C. to 80° C., is advantageous in the process according to the invention.

The mixing apparatus with a staged effect in the sense of the invention, are those reactors that permit a continuous mixing of the reaction partners along a reaction course as well as the addition of one of the reaction partners in the form of partial streams, with the staged effect characterizing a restriction of the forward or backward streaming of the reaction mixture in the mixing apparatus. This can also be considered a progressively, separately zoned mixing area where each zone contains a restriction to the forward or backward flow of the reaction mixture.

As concerns the dimensions of the mixing apparatus, the chosen number of partial streams of the latter or second reaction component, must be taken into consideration besides the desired throughput on the one hand, as well as the mean holding time of the reaction partners within the entire mixing apparatus required for an optimal mixing on the other hand. The mean holding time is determined by the total volume of the solutions flowing into the mixing apparatus per mixer volume (taking into consideration the dead space) and time.

In view of the dependence of the holding time behavior of the reaction partners, particularly of the mean holding time, on the so-called step effect degree of the used stage of the mixing apparatus as well as on relations between actual and theoretical number of phases of multiphase mixing systems, mention is made of the respective manuals of chemical engineering, e.g., "Ullmans Encyklopadie der technischen Chemie", 4. Auflage, Band 3 (4th ed. vol. 3), "Verfahrenstechnik II und Reaktionsapparate", 1973, Verlag Chemie, pp. 342 to 354.

It is preferable to allow the total product stream, that is, the stream of the former or first reaction component on the one hand, and the partial streams of the latter or second reaction component on the other, to flow into the mixing apparatus with a dosing rate of 3 to 30 m³ of solution, preferably more than 4 m³ of solution, per cubic meter of mixer volume and per hour, with the mean holding time of the reaction partners in the mixing apparatus amounting to 2 to 20 minutes, particularly less than 15 minutes. The means holding time in each stage of the mixing apparatus depends on the total number of stages. A minimum of five stages and a minimum of at least 5 seconds holding time per stage is required. Preferably the mean holding time per stage is from 10 seconds to 2 minutes.

According to a special type of example of the process according to the invention, the individual partial streams of the latter or second reaction component are fed respectively into different tanks of a series of tanks with agitators connected in cascade by pipes, the series containing at least as many tanks as the latter or second reaction component contains partial streams.

Figure 6:
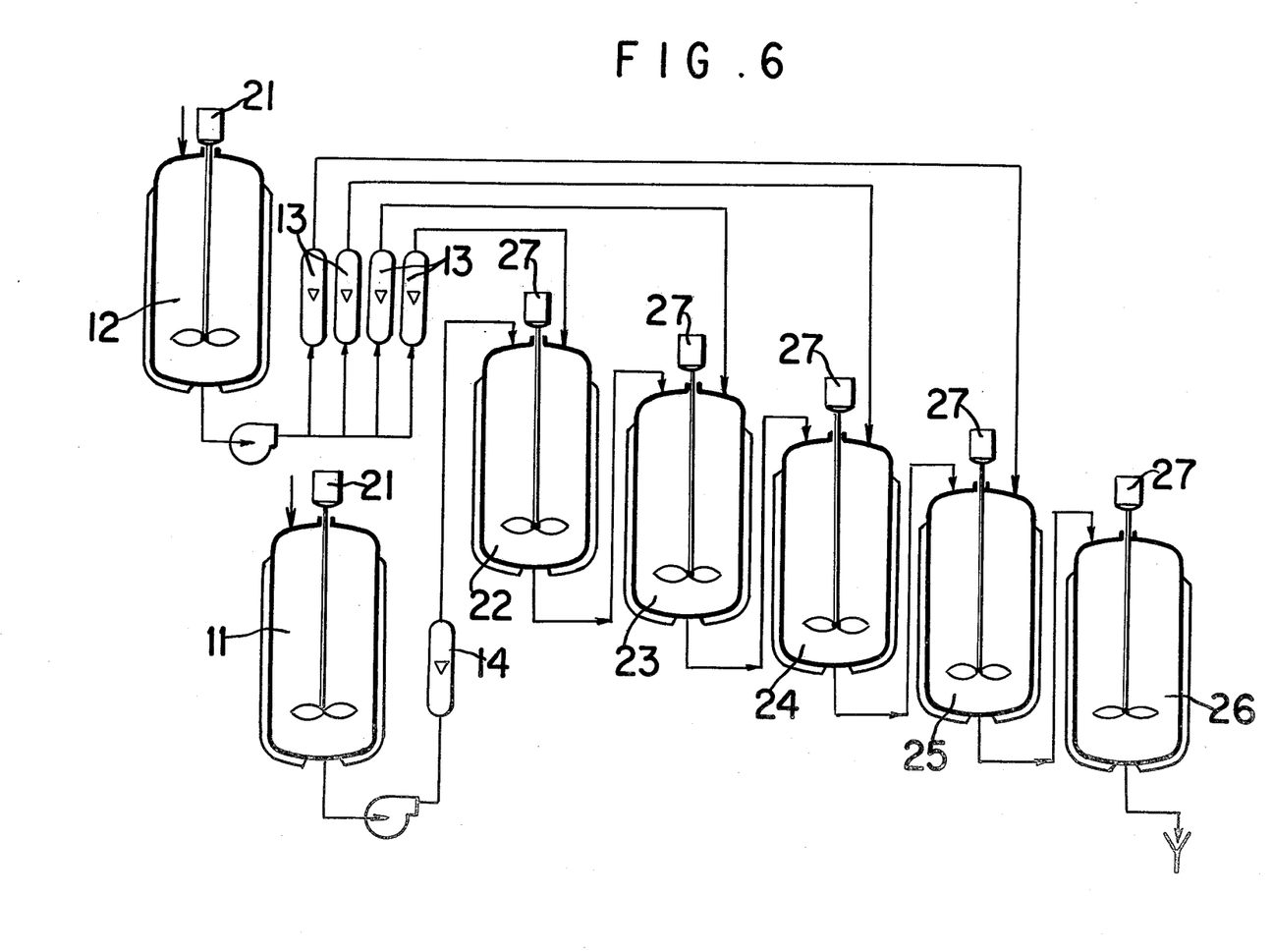
FIG. 6 is a flow diagram of the process of the invention employing a block of agitated tanks as the mixer having progressively, separately zoned mixing areas.

Thus a series of tanks with agitators connected in cascade is used as mixing apparatus with a step effect in the sense of the invention, with the individual tanks of the series representing the several steps of the mixing apparatus into which the split partial streams of the latter or second reaction component are dosed. FIG. 6 is a flow diagram of such an embodiment.

The series of tanks with agitators connected in cascade consists of continuously operated ideal tanks connected in series. The reaction partners or their mixture are continuously fed and the final mixture containing the reaction products and unconverted reaction partners is continually removed. The stream of product of the preceding agitator tank is the feeding stream for the following tank. The characteristic of the ideal tank as a homogeneous and stationary reactor applies then to each of the agitator tanks. A step-like concentration pattern of the reaction partners results for the series of agitator tanks in its entirety.

Instructions for the assembling and operation of ideal tanks and blocks of agitator tanks, including mathematical treatment, can be found in the manuals of chemical engineering, such as, in the above-cited reference, "Ullmans Encyklopadie der technischen Chemie".

The most important characteristic of the ideal agitator tank is the mixing. The mathematical description of the ideal agitator tank is based mainly on the assumption of complete mixing of the tank contents, that is, that the reaction mixture at the tank outlet and in the agitator tank itself has the same composition. A good agitation is the prerequisite for the required complete mixing of the reaction partners in the ideal agitator tank; otherwise, part of the reaction liquid might flow directly from the tank intake to the tank outlet, and a large portion of the tank contents would simply be dead volume.

The assumption of ideal mixing applies only approximately to the actual case. The mixing time, within which the contents of an agitator tank are mixed homogeneously, can be calculated for various conditions. Ideal mixing is practically achieved when the mean holding time in the agitator tank considerably exceeds the mixing time. Experience shows that an ideal behavior is adequately approximated when the mean holding time is approximately 5 to 10 times greater than the calculated mixing time.

Questions of scale are unimportant in the interpretation of series of agitator tanks, when ideal flow behavior as described above is present. The mean holding time, which describes reactors of any size, is the important parameter, in this respect. However, for changes of scale in actual cases, it must be remembered that the mixing time as well as the ratio of surface to tank volume are dependent on the size of the tank. This ratio has a crucial influence on the addition and escape of heat since the amount of heat to be transported through the tank wall is proportional to the tank surface; the heat reaction, however, is proportional to the utilized tank volume. Thus, when assembling series of agitator tanks, it must be determined whether the mixing time is very short in comparison with the mean holding time, as stipulated above.

The peak efficiency of a series of agitator tanks can be achieved according to various points of view. With respect to process technology, it is usually important how the relations of the volumes of the individual tanks must be adjusted to one another so that either the series has the smallest total volume at a given throughput, or that the greatest throughput can be reached in a series of a given total volume. In view of the applicable laws of kinetics, all agitator tanks must have the same volume for most chemical reactions. Series of agitator tanks connected in cascade with uniform tanks are preferred for reactions of any order, for reasons of standardization. Additional possibilities for efficiency are found in considerations of economy and in considerations of optimal reaction design. Series of agitator tanks connected in cascade with more than approximately five stages are uneconomical as far as cost is concerned.

According to the invention, the total stream of the former or first reaction component as well as the first partial stream of the latter or second reaction component are fed simultaneously, continuously into the first tank of the series, with the aid of the proper dosing equipment. Other partial streams of the latter or second reaction component are then fed into the respective tanks connected to it downstream. Here it is advantageous to agitate so that the mixing time amounts to maximally 1/5, but preferably to 1/10, of the mean holding time. Mixing times and mean holding times, for example, can be determined according to the literature source cited above. The utilized series of agitator tanks connected in cascade should contain at least as many agitator tanks as the split component contains partial streams; preferably, however, a greater number of tanks (maximally greater by two, for economic reasons) are supplied. Thus a mixing apparatus of adequate length remains after the complete addition of the two components, and the suspension becomes especially homogeneous and fine in particle size.

According to another form of example of the process according to the invention, the individual partial streams of the latter or second reaction component are fed respectively into different chambers, divided by partitions and equipped with agitators, of a horizontal mixing section that is subdivided into at least as many chambers as the number of partial streams in the latter or second reaction component.

A differential spiral mixer with separate chambers, which permits the feeding of several partial streams downstream, is particularly suitable as such a mixing section with step effect.

Differential spiral mixers are horizontally position trough-mixers operating according to the principle of opposing spirals. These opposing spirals are attached to the same shaft and act as scoops that transport forward and in reverse and result in extremely intensive mixing of the reaction components by their opposing operation. The transporting difference of the two scoop systems corresponds to the mixing capacity per unit of time. The holding time of the material to be mixed in the mixer can be influenced to a certain degree by the adjustable scoop angles. The product to be mixed is thus moved not only in the forward direction but also thrown back simultaneously, in small impulses. Together with a strong turbulence and a continuous separation of the stream, the material to be mixed thus describes a so-called pilgrim's step movement, that is, a forward and backward motion with a preponderant forward movement and is mixed extremely well within a short period of time.

Especially suitable for the process according to the invention, in the sense of the special form of operation described above, is such a differential spiral mixer that, in addition, is constructed or equipped to produce a step effect. This means that the mixing space is subdivided into individual chambers or stages by the installation of sheet metal partitions with overflow, or similar equipment. This prevents an excessive reverse transporting of the material to be mixed, against the flow direction of the stream, since this would cancel out the effect obtained with the splitting of one of the reaction components at least partially. FIGS. 1 to 5 depict this embodiment.

According to the invention, the total stream of the former or first reaction component as well as the firsts partial stream of the latter or second reaction component are introduced simultaneously, continuously into the first chamber located in one end of the mixer, with the aid of respective dosing equipment. A respective, additional partial stream of the latter or second reaction component is then fed into the next chambers that are adjoining downstream, with the option of skipping certains chambers, if desired.

The utilized differential spiral mixer should be divided into at least as many chambers as the number of partial streams of the split component; preferably, however, into a larger number, if possible, twice the number of chambers. Consequently, a mixing apparatus of adequate length remains after the completed addition of the two reaction components into the mixer, to produce an especially homogeneous suspension of finely divided precipitation products. The mixing effect of the mixer is utilized to the fullest in this manner. Finally, the length and geometry of the differential spiral mixer are determined by the arrangement, number and size of the chambers. The individual chambers can be of the same size or different in size. The length of the chambers should be at least 30 cm, to permit the addition of the respective partial stream, on the one hand, in the technically simplest manner, and to guarantee, on the other hand, a mean holding time of the reaction partners of at least 5 seconds in that chamber prior to the introduction of the next partial stream in a downstream chamber.

In view of the intensive mixing effect of the differential spiral mixer with step effect and the given mean holding time of the reaction partners in the mixer, the agitation speed may be limited to below 200 rpm, even to below 100 rpm, if desired. This relatively low agitator rotation considerably simplifes the problems resulting from the position and packing of the agitator shaft.

Figure 7:
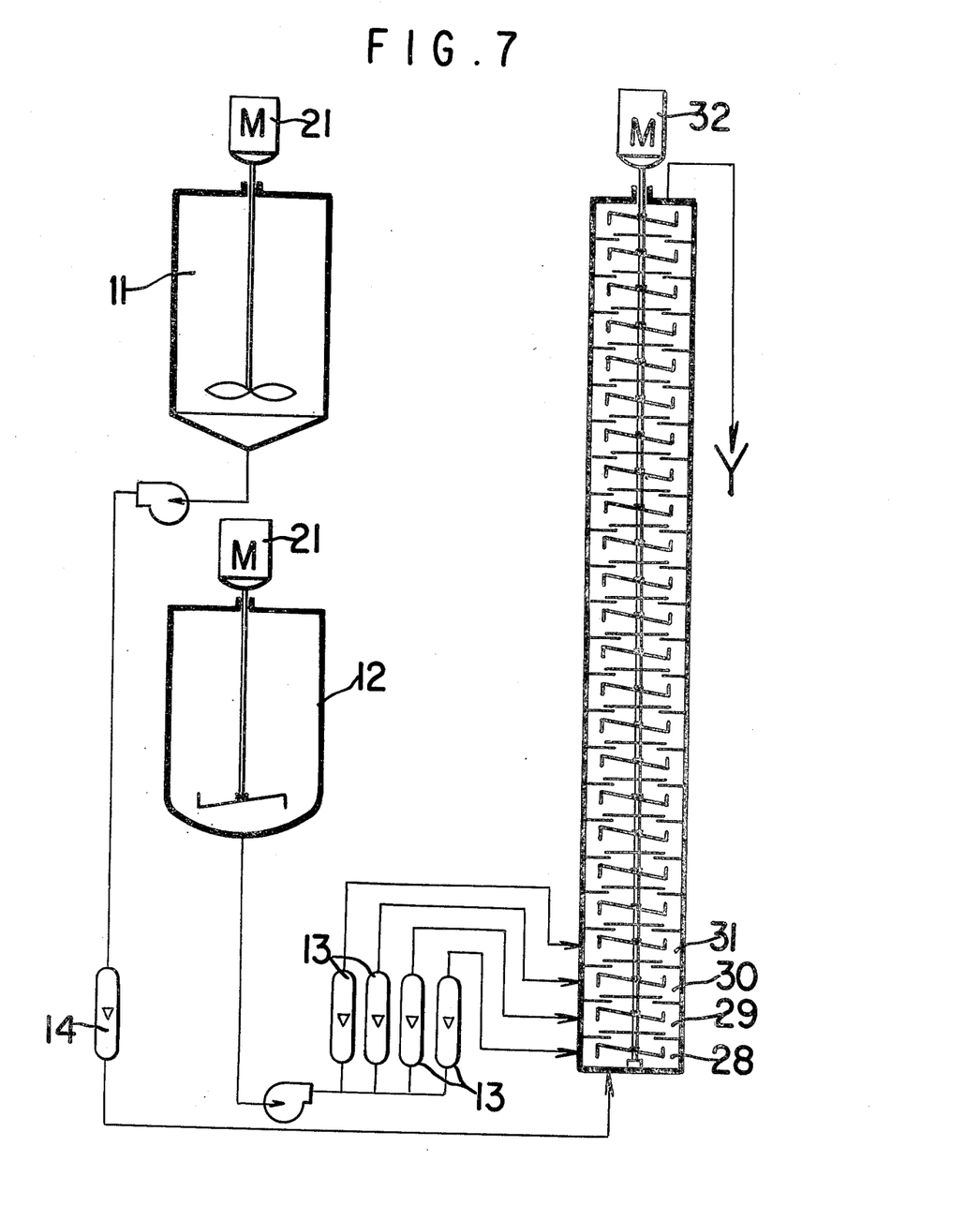
FIG. 7 is a flow diagram of the process of the invention employing an agitator column with separating trays as the mixer having progressively separately zoned mixing areas.

According to a third, preferred form of example of the process according to the invention, the individual partial streams of the latter reaction component are introduced respectively into different chambers, separated by intermediate trays of a preferably vertically arranged agitator column containing at least four intermediate trays. FIG. 7 is a flow diagram of such an embodiment.

An agitator column is used as mixing apparatus with a stage effect in the sense of the invention, which permits the addition of the split partial streams of the latter or second reaction component into individual chambers, that is, stages of the column.

Agitator columns consist of a cylindrical reactor that is subdivided by partitions into chambers of preferably equal size. This type of reactor thus is occassionally called a "chamber reactor" in the literature. Analogous to the distillation columns, the partitions are also called "trays" in the agitator columns. Equally analogous is the definition of the stage number as product of (actual) number of trays and degree of effectiveness of the stages (see a manual of chemical engineering). The distance between the trays, that is, the height of the chambers, lies in the range of the 0.35 to 0.5 times the diameter of the reactor for technically conventional agitator columns.

The agitators for the individual chambers are mounted together on a shaft in the stirrer axis. The bearings usually are at the ends. An intermediate bearing is technically meaningful only with especially long agitator shafts. The selection of the agitators with respect to type and size of agitator, required performance, current spoiler and similar factors can vary widely. The calculation of the mean holding time, holding time distribution and concentration of the reactants in an agitator column is identical with that for a block of agitator tanks of the same stage number. However, higher stage numbers can be obtained at smaller expense by using an agitator column. The liquid in agitator columns moves from chamber to chamber through openings in the bottoms. Agitator columns can be operated with any spatial orientation, thus upright, horizontally or inclined. However, they are operated preferably in upright position, flooded with liquid rising from the bottom to the top. Details and special forms can be found in manuals of chemical engineering, such as in the above-cited reference "Ullmanns Encyklopadie der technischen Chemie".

According to the invention, the total stream of the former or first reaction component as well as the first partial stream of the latter or second reaction component are introduced simultaneously, continuously into the lowest chamber at the bottom of the vertically standing column, with the aid of respective dosing equipment. Then an additional partial stream of the latter or second reaction component is fed into the respective chambers lying above, that is, downstream, at an ascending direction of flow in the column. Individual chambers may also be skipped with this type of feeding of the split component, to obtain an optimal degree of mixing of the combined reaction components.

The utilized agitator column should have at least four, preferably, however, a larger number of intermediate trays. In view of the desired mean holding time of the reaction partners in the column, as explained above, the peripheral agitator velocity can be restricted to below 6 meters per second, if desired even to below 4 meters per second, depending on the type of agitator.

The respective used mixing apparatus can be enclosed completely or partly with a heating mantle for steam, hot water or other conventional heat exchange media. The continuous precipitation thus can be performed largely isothermically, for example, with a tolerance of ±2° C., and heat radiation can be compensated for. If desired, the area of the mixer outlet may also have an additional mantle, either to cool the precipitation product or to heat from the precipitation temperature to the required crystallization temperature.

The continuously prepared amorphous sodium aluminosilicate can be crystallized in the smallest molecular sieve particles of type NaA by heating to a temperature of 85° C., for example. The time needed for crystallization is very short. Details about carrying out the crystallization as well as about the properties of the crystalline products are given in the following examples. If the subsequent crystallization of the amorphous reaction product is to be omitted, this is worked up directly. For the working up of the amorphous as well as of the crystalline products, they are first filtered off the mother liquor, washed and dried, depending on the requirements for their intended use, or finished in some other, conventional way, if desired. Mother liquor and wash liquids can be returned into the process.

The obtained sodium aluminosilicates, particularly the molecular sieve NaA, finds application preferably as heterogeneous inorganic builders (phosphate substitutes) in washing, rinsing and cleaning agents.

The performance of the process according to the invention is explained in more detail in the following examples.

EXAMPLES

A mixing apparatus with a stage effect was used in the following examples, such as a differential spiral mixer (Examples 1 and 2), a block of agitator tanks (Examples 3 and 4) as well as an agitator column (Examples 5 and 6). Data that are the same for all examples are summarized below.

The aluminate solutions were prepared from moist hydrargillite with 58% $Al_2O_3$ or from technical grade sodium meta-aluminate (95% pure, 54% $Al_2O_3$ and 41% $Na_2O$) with the addition of technical grade 50% sodium hydroxide solution and deionized water. The silicate component was prepared from technical grade water glass solution (8% $Na_2O$, 26.9% $SiO_2$), technical grade 50% sodium hydroxide solution as well as recycled mother liquor. The aluminate and silicate solutions were filtered prior to their use, the concentrations of alkali, aluminate or silicate were determined analytically.

Samples were removed from the continuously discharging product stream and crystallized separately under laboratory conditions for the determination of the ability of the obtained amorphous sodium aluminosilicate to crystallize. For this purpose, 1,500 gm of the suspension obtained were agitated in a 2-liter, three-necked flask with heating unit, contact thermometer, mounted reflux condenser and agitator, at 85° C. After the completed crystallization, the solids were separated by filtration and washed with deionized water heated to 60° C. until the wash water had a residual alkalinity corresponding to pH 9 to 10.

For characterization, the washed products were dried overnight at 100° C. in a vacuum oven, well ground and identified by their X-ray diagrams. The composition with respect to $Na_2O$, $SiO_2$ and $Al_2O_3$ was determined by x-ray fluorescence analysis. The loss of moisture on heating for one hour at 800° C. was recorded as the moisture content. The crystal habit was determined by the scanning electron microscope, the granule size distribution by the Coulter counter, the wet screening residue according to Mocker, with the use of a 25μ screen according to DIN 53580 (slurry of 1 gm of active substance in 100 ml of deionized water, homogenized for one minute in the ultrasonic bath, five minutes wet screening with water pressure of 4 bar and a flow rate of 400 liters of water per hour, reweighing of dried screens).

The calcium-binding capacity (CaBC) of the dried products was determined according to German Published Application DE-OS No. 2,412,837 (page 27) after ten minutes at 22° C.±2° C. with 1 gm active substance per liter and 30° dH (German hardness) initial hardness, and recorded as "mg CaO/gm As" (AS=active substance).

EXAMPLES 1 AND 2

The differential spiral mixer shown in FIG. 1 to 4 in different, simplified views was used for the following examples.

Figure 1:
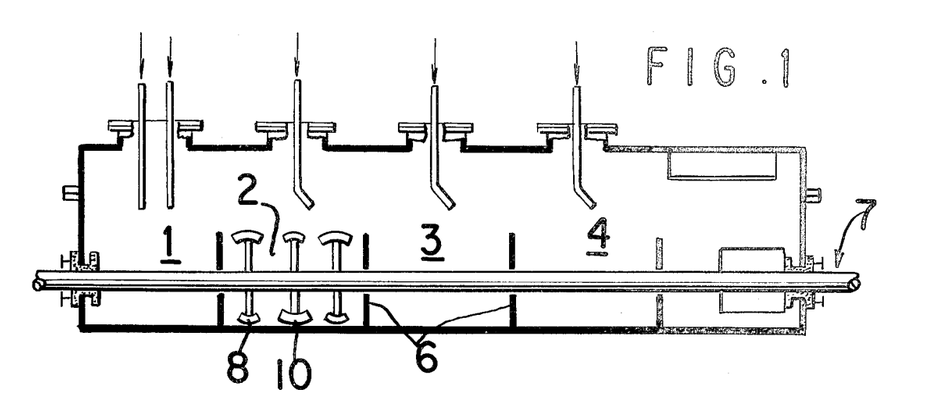
FIG. 1 is a cross-sectional side view of a spiral mixer having progressively, separately zoned mixing areas.
Figure 2:
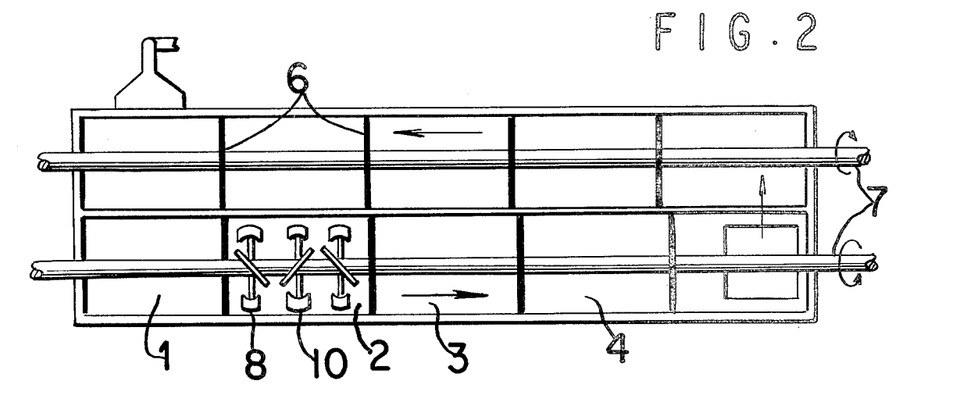
FIG. 2 is a cross-sectional top view of the mixer of FIG. 1.
Figure 3:
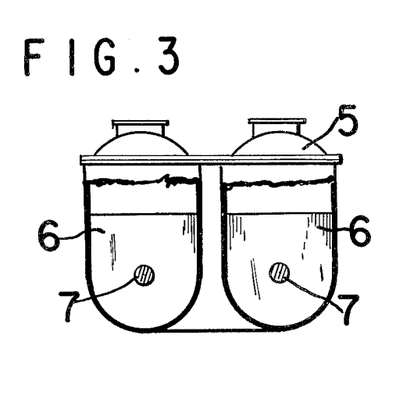
FIG. 3 is a cross-sectional end view of the mixer of FIG. 1 with top.
Figure 4:
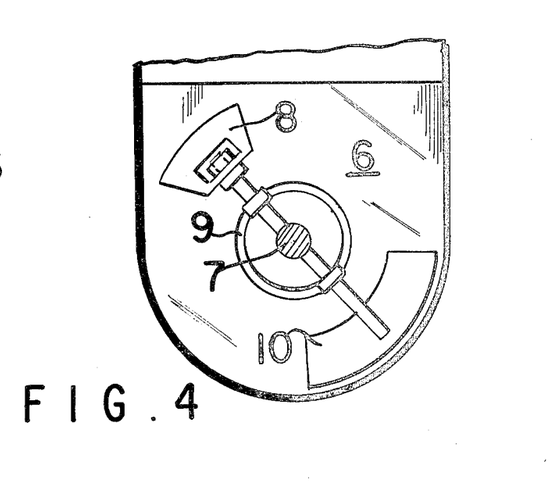
FIG. 4 is an enlarged cross-sectional end view of one trough of the mixer of FIG. 1.

FIG. 1 shows a side view and FIG. 2 shows a view from above, both cross-sectional, of the differential spiral mixer. The numbers 1 to 4 in the figure mark the first four chambers of the mixer, into which the reaction components are introduced. FIGS. 3 and 4 show two cross-sections of the mixer. In the FIGS., 5 is the cover; 6 is the over-flow sheet metal partition; 7 is the agitator shaft; 8 is the small scoop; 9 is the axial ring gap in 6; and 10 is the large scoop.

The utilized differential spiral mixer is a double-trough type in which the mixing tools work in two separate, parallel troughs. Due to this compact arrangement, the space requirements are reduced in comparison with single-trough types. the mixer had a length of 200 cm, a width of 52 cm and a height of 35 cm. The agitator diameter was 24 cm. Both troughs were subdivided into five chambers of approximately equal size, respectively, by sheet metal partitions 25 cm in height. Twelve scoops each per chamber were attached to the agitator shaft; four of these scoops were adjusted so that they did not transport but served solely for mixing. The other agitator elements transported the liquid. The overflow across the metal partitions 6 and through the axial ring gap in the agitator shaft area 9 served to move the material away. The flow direction changed by 180° as the material to be mixed flowed from the first mixing trough into the second parallel trough. The two mixing troughs were covered with two separate covers 5, which also contained the intakes for the components. The direction of rotation of the agitator shafts is indicated in the FIGS. 1 and 2. The agitator speed could be varied indefinitely in the range from 120 to 220 rpm. The effective total volume of the differential spiral mixer was approximatey 180 liters.

The components were pumped, after heating to precipitation temperature, from the large stock tanks directly into the differential spiral mixer via separately calibrated dosing devices (rotameters). The experimental arrangement, which is suitable for the separation of one of the two components into up to four partial streams, can be deduced from the simplified flow diagram according to FIG. 5.

Figure 5:
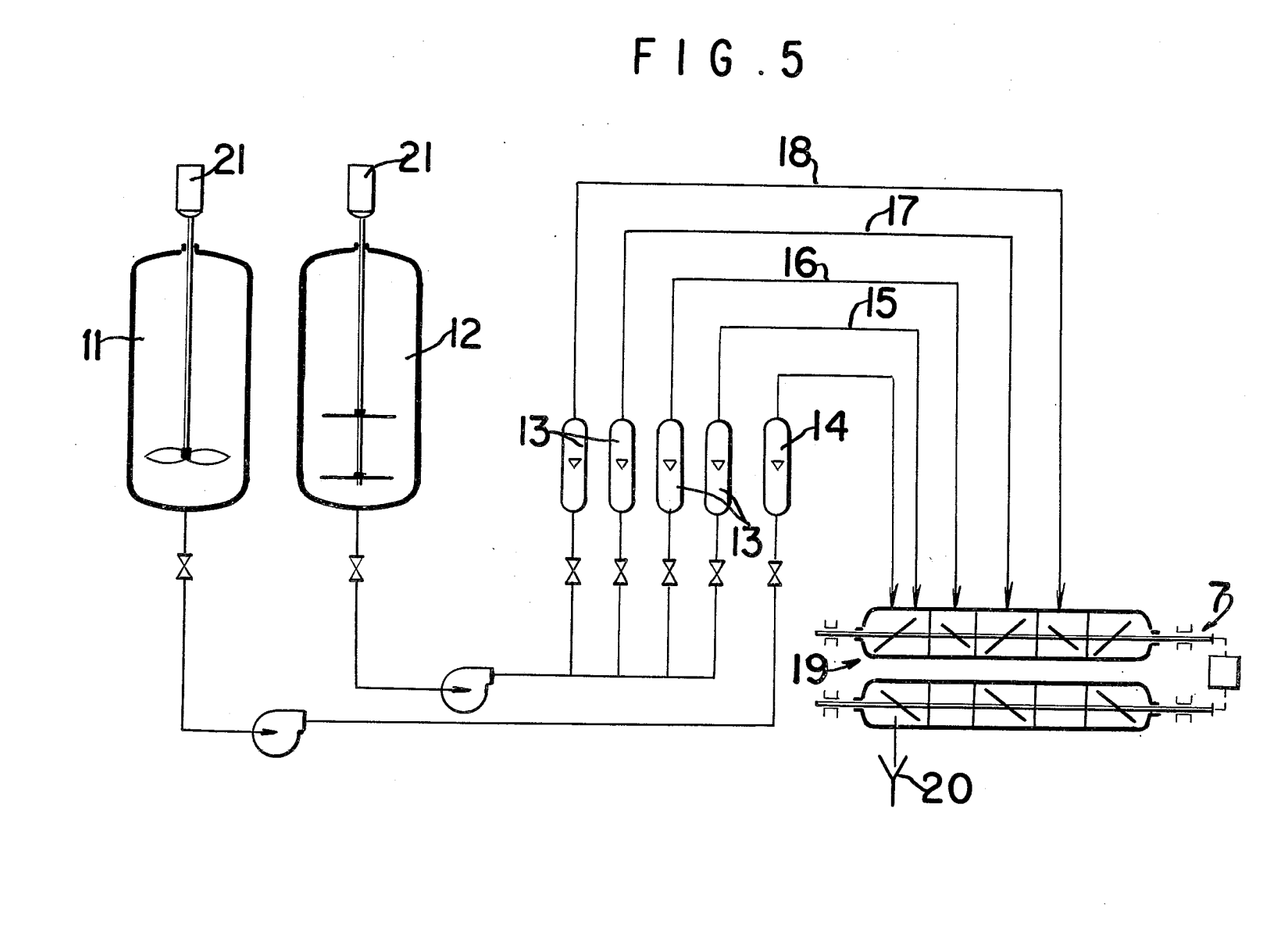
FIG. 5 is a flow diagram of the process of the invention employing the spiral mixer of FIG. 1.

The numbers have the following significance:
11 is the stock tank for the component that is not split;
12 is the stock tank for the component to be split;
13 are the dosing devices for the component to be split;
14 is the dosing device for the component that is not split;
15 is the partial stream 1; 16 is the partial stream 2;
17 is the partial stream 3; 18 is the partial stream 4;
19 is the differential spiral mixer; 20 is the mixer outlet, and 7 is the agitator shaft.

EXAMPLES 1a TO 1k

To these examples, only the concentrations and dosages of the utilized sodium aluminate and sodium silicate solutions were varied, while the other precipitation conditions remained the same. The precipitations were performed in the described mixer at a constant agitator speed of 120 rpm. The solutions were preheated to 65° C. before dosing. The mixer also was warmed to a constant 65° C. by heating the mantel (not shown). The aluminate solutions were prepared from moist hydrargillite. The silicate solution was (without splitting into partial streams) pumped continuously, respectively, into chamber 1 of the mixer, at the concentration recorded in Table 1. The aluminate solution was split into four partial streams, respectively. One stream with 50% of the total amount required according to Table 1 was fed continuously into chamber 1, one stream of 30% of the total amount into chamber 2, and two streams of 10% each of the total amount into chambers 3 and 4 of the mixer.

The amorphous reaction mixture suspension leaving the mixer continuously had a temperature of 65° to 67° C., was always homogeneous and had good flow capability. The proportions of granules exceeding 50μ were below 1% by weight.

The products obtained from this after 40 minutes of crystallization were identified in all cases as highly crystalline molecular sieve NaA still containing bound water and having a chemical composition corresponding to molar ratios of:

$$1.0Na_2O:1.0Al_2O_3:1.8-2.0SiO_2.$$

The Ca-binding capacity was above 160 mg CaO/gm active substance. All products had an average particle size of below 7μ and granule size proportions of less than 10μ exceeding 95% by volume. The wet screening residue according to Mocker was less than 1% by weight.

The following Table 1 shows examples with various total molar ratios in the precipitation batch and variation of the total throughput (precipitation at 65° C., agitator speed 120 r.p.m., splitting of the aluminate component corresponding to 50%+30%+10%+10%, respectively).

TABLE 1

| | Aluminate Solution | | | Silicate Solution | | | Total Molar Ratios in the Precipitation Bath Based on $Al_2O_3 = 1$ | | | Total | Average |
|---|---|---|---|---|---|---|---|---|---|---|---|
| Example | % $Al_2O_3$ | % $Na_2O$ | Dosing kg/hr | % $SiO_2$ | % $Na_2O$ | Dosing kg/hr | $Na_2O$ : | $SiO_2$ : | $H_2O$ | Throughput kg/hr | Particle Size in μ |
| 1a | 12.92 | 14.06 | 790 | 12.35 | 7.85 | 631 | 2.6 | 1.3 | 60 | 1421 | 6.0 |

TABLE 1-continued

| | Aluminate Solution | | | Silicate Solution | | | Total Molar Ratios in the Precipitation Bath Based on $Al_2O_3 = 1$ | | | Total Throughput | Average Particle |
|---|---|---|---|---|---|---|---|---|---|---|---|
| Example | % $Al_2O_3$ | % $Na_2O$ | Dosing kg/hr | % $SiO_2$ | % $Na_2O$ | Dosing kg/hr | $Na_2O$ : | $SiO_2$ : | $H_2O$ | kg/hr | Size in $\mu$ |
| 1b | 12.92 | 14.06 | 395 | 12.35 | 7.85 | 316 | 2.6 | 1.3 | 60 | 711 | 6.5 |
| 1c | 12.92 | 14.06 | 790 | 13.11 | 12.19 | 916 | 3.6 | 2.0 | 70 | 1706 | 5.1 |
| 1d | 12.92 | 14.06 | 395 | 13.11 | 12.19 | 459 | 3.6 | 2.0 | 70 | 854 | 5.8 |
| 1e | 12.43 | 17.38 | 819 | 10.26 | 7.66 | 1050 | 3.6 | 1.8 | 80 | 1869 | 5.0 |
| 1f | 12.43 | 17.38 | 273 | 10.26 | 7.66 | 350 | 3.6 | 1.8 | 80 | 623 | 5.3 |
| 1g | 10.12 | 18.45 | 504 | 6.36 | 8.77 | 849 | 5.4 | 1.8 | 120 | 1353 | 4.5 |
| 1h | 12.43 | 17.38 | 821 | 16.17 | 8.36 | 668 | 3.2 | 1.8 | 60 | 1489 | 5.8 |
| 1i | 10.12 | 18.45 | 1008 | 8.47 | 6.81 | 1275 | 4.4 | 1.8 | 100 | 2283 | 4.3 |
| 1k | 10.12 | 18.45 | 336 | 8.47 | 6.81 | 425 | 4.4 | 1.8 | 100 | 761 | 4.7 |

EXAMPLES 2a TO 2K

In these examples, the batch and concentration ratios during the precipitation were kept constant, whereas the splitting of one of the two components into partial streams, the agitator speed and the temperature were varied. The aluminate solution and the silicate solution were dosed according to Example 1e, thus with a total of 819 kg aluminate solution (12.43% $Al_2O_3$ and 17.38% $Na_2O$) per hour as well as with a total of 1,050 kg silicate solution (10.26% $SiO_2$ and 7.66% $Na_2O$) per hour. From this resulted a total molar ratio in the precipitation batch of:

$3.6Na_2O:1.0Al_2O_3:1.8SiO_2:80H_2O$.

The aluminate solution was prepared from technical grade sodium meta-aluminate.

The splitting of the components (aluminate solution or silicate solution) into partial streams of different sizes as well as the temperature of the components can be seen from the data in Table 2.

The amorphous reaction mixtures leaving the mixer continuously had a temperature corresponding to the precipition temperature, was always homogeneous and had good flow capability. The proportions of granules larger than 50$\mu$ were less than 1% by weight.

The products obtained after 40 minutes of crystallization were identified in all cases as highly crystalline molecular sieve NaA still containing bound water and having a chemical composition corresponding to the molar ratios of:

$1.0Na_2O\cdot1.0Al_2O_3\cdot1.8SiO_2$

The calcium binding capacity was near or above 150 mg CaO/gm AS. All products had an average particle size of less than 7$\mu$ and granule size proportions of less than 10$\mu$ exceeding 95% by volume. The wet screening residue according to Mocker was less than 1% by weight.

The hexahedral crystallites had mainly rounded edges and a length of 0.5 to 3$\mu$ for the edges.

The following Table 2 shows examples with different splitting of the components and variations of the agitator speed and precipitation temperature (dosing and molar ratios in the total batch corresponding to Example 1e, see Table 1).

TABLE 2

| Example | Splitting of the Aluminate Solution in % Portions | Splitting of the Silicate Solution in % Portions | Agitator R.P.M. | Precipitation Temperature | Average Particle Size in $\mu$ | CaBC |
|---|---|---|---|---|---|---|
| 1e | 50 + 30 + 10 + 10 | Unsplit | 120 | 65° C. | 5.0 | 168 |
| 2a | 60 + 20 + 20 | | | | 5.2 | 163 |
| 2b | 50 + 30 + 20 | Unsplit | 120 | 65° C. | 5.1 | 160 |
| 2c | 40 + 40 + 20 | | | | 5.3 | 161 |
| 2d | 60 + 20 + 10 + 10 | Unsplit | 120 | 65° C. | 5.0 | 158 |
| 2e | 40 + 30 + 20 + 10 | | | | 5.0 | 157 |
| 2f | 50 + 30 + 10 + 10 | Unsplit | 220 | 65° C. | 6.8 | 150 |
| 2g | 50 + 30 + 10 + 10 | | 120 | 80° C. | 4.7 | 150 |
| 2h | | 50 + 30 + 10 + 10 | | 65° C. | 6.2 | 152 |
| 2i | Unsplit | 40 + 30 + 20 + 10 | 120 | 65° C. | 5.8 | 150 |
| 2k | | 40 + 40 + 20 | | 50° C. | 5.8 | 153 |

EXAMPLES 3 AND 4

A series of agitator tanks with five agitator tanks, the arrangement of which is shown simplified in FIG. 6, was used for the performance of the following examples.

The agitator tanks were equipped with mantle heaters and identical agitator systems, had the same form and size (30 cm diameter, approximately 60 cm height) and had an effective reactor volume (up to the overflow) of about 40 liters each. The component to be split was stored in tank 12, the component not to be split, in tank 11, and heated to the given temperature. The dosing of the partial streams as well as the main stream that was not split was taken care of by separately calibrated dosing devices 13 and 14 (rotometer).

Standardized agitators 27 with current spoilers were used for the mixing of the reaction mixture in tanks 22 to 26. The agitator speeds were adjusted according to the peripheral velocities given in the examples.

EXAMPLES 3a TO 3k

In these examples, the concentrations and doses of the utilized sodium aluminate and sodium silicate solutions were varied, while the other pecipitation conditions were kept constant. The precipitations were carried out in the described series at a constant speed of the agitators corresponding to a peripheral velocity of 6 meters per second. The solutions were preheated to 65° C.

prior to dosing. The tanks of the series were also kept at a constant 65° C. with mantle heat. The aluminate solutions were prepared from moist hydrargillite.

The silicate solution (without splitting into partial streams) was pumped continuously at the concentrations and doses given in Table 3, into tank 22 of the block. The aluminate solution was split into four partial streams, respectively. One stream with 50% of the total amount required according to Table 3 was fed continuously into tank 22, one stream of 30% of the total amount, into tank 23, and two streams of 10% each of the total amount, into tanks 24 and 25 of the tank series. Tank 26 of the series served for additional mixing and as holding time tank.

The amorphous reaction mixture leaving the tank series continuously beyond tank 26 had a temperature of 65° to 67° C., was always homogeneous and had a good fluidity. The proportions of granules larger than 50μ were below 1% by weight. The products obtained from them after 40 minutes of crystallization were identified in all cases as highly crystalline molecular sieve NaA that still contained bound water and had a chemical composition corresponding to the molar ratios of:

1.0Na$_2$O:1.0Al$_2$O$_3$:1.8–2.0 SiO$_2$.

The calcium-binding capacity was above 160 mg CaO/gm active substance. All products had an average particle size below 7μ and granule size proportions smaller than 10μ exceeding 95% by volume. The wet screening residue according to Mocker was less than 1% by weight.

The following Table 3 shows examples of different total molar ratios in the precipitation batch with variation of the total throughput (precipitation at 65° C., peripheral agitator velocity 6 m/second, splitting of the aluminate component corresponding to 50% + 30% + 10% + 10%, respectively).

solution were dosed according to Example 3e, thus with a total of 819 kg of aluminate solution (21.43% Al$_2$O$_3$ and 17.38% Na$_2$O) per hour as well as a total of 1,050 kg of silicate solution (10.26% SiO$_2$ and 7.66% Na$_2$O) per hour. From this resulted a total molar ratio in the precipitation batch of:

3.6 Na$_2$O:1.0 Al$_2$O$_3$:1.8 SiO$_2$:80 H$_2$O.

The aluminate solution was prepared from technical grade sodium meta-aluminate.

The splitting of the component (aluminate solution or silicate solution) into partial streams of different size, the adjustment of the agitator speed as well as the temperature of the components can be found in the data in Table 4. When one of the two components was split into three partial streams only (Examples 4a to 4c as well as 4k), tank 26 in the block was not used and the reaction mixture was removed from beyond tank 25. The amorphous reaction mixture leaving the block continuously had a temperature corresponding to the precipitation temperature and was always homogeneous with good fluidity. The proportions of granules exceeding 50μ were below 1% by weight.

The products obtained after 40 minutes of crystallization were identified in all cases as highly crystalline molecular sieve NaA that still contained bound water and had a chemical composition corresponding to molar ratios of:

1.0 Na$_2$O·1.0 Al$_2$O$_3$·1.8 SiO$_2$.

The calcium-binding capacity was at or above 150 mg CaO/AS. All products had an average particle size of less than 7μ and granule size proportions of less than 10μ exceeding 95% by volume. The wet screening residue according to Mocker was less than 1% by weight.

TABLE 3

| | Aluminate Solution | | | Silicate Solution | | | Total Molar Ratios in the Precipitation Bath Based on Al$_2$O$_3$ = 1 | | | Total Throughput | Average Particle |
|---|---|---|---|---|---|---|---|---|---|---|---|
| Example | % Al$_2$O$_3$ | % Na$_2$O | Dosing kg/hr | % SiO$_2$ | % Na$_2$O | Dosing kg/hr | Na$_2$O : | SiO$_2$ : | H$_2$O | kg/hr | Size in μ |
| 3a | 12.92 | 14.06 | 1185 | 12.35 | 7.85 | 947 | 2.6 | 1.3 | 60 | 2132 | 6.1 |
| 3b | 12.92 | 14.06 | 1422 | 12.35 | 7.85 | 1138 | 2.6 | 1.3 | 60 | 2560 | 6.4 |
| 3c | 12.92 | 14.06 | 790 | 13.11 | 12.19 | 916 | 3.6 | 2.0 | 70 | 1706 | 6.1 |
| 3d | 12.92 | 14.06 | 1185 | 13.11 | 12.19 | 1375 | 3.6 | 2.0 | 70 | 2560 | 5.8 |
| 3e | 12.43 | 17.38 | 819 | 10.26 | 7.66 | 1050 | 3.6 | 1.8 | 80 | 1869 | 5.0 |
| 3f | 12.43 | 17.38 | 1092 | 10.26 | 7.66 | 1400 | 3.6 | 1.8 | 80 | 2492 | 5.4 |
| 3g | 10.12 | 18.45 | 1008 | 6.36 | 8.77 | 1698 | 5.4 | 1.8 | 120 | 2706 | 4.3 |
| 3h | 12.43 | 17.38 | 1232 | 16.17 | 8.36 | 1002 | 3.2 | 1.8 | 60 | 2234 | 6.3 |
| 3i | 10.12 | 18.45 | 1176 | 8.47 | 6.81 | 1488 | 4.4 | 1.8 | 100 | 2664 | 4.5 |
| 3k | 10.12 | 18.45 | 672 | 8.47 | 6.81 | 850 | 4.4 | 1.8 | 100 | 1522 | 4.9 |

EXAMPLES 4a TO 4k

In these examples, the batch and concentration ratios during the precipitation were kept constant, while the splitting of one of the two components into partial streams, the agitator speed as well as the temperature were varied. The aluminate solution and the silicate The hexahedral crystallites had mainly rounded edges and a length of 0.5 to 3μ for the edges.

The following Table 4 shows examples with different splitting of the components and variations in agitator speed and precipitation temperature (dosing and molar ratios in the total batch corresponding to Example 3e, see Table 3).

TABLE 4

| Example | Splitting of the Aluminate Solution in % Portions | Splitting of the Silicate Solution in % Portions | Peripheral Agitator Velocity | Precipitation Temperature | Average Particle Size in μ | CaBC |
|---|---|---|---|---|---|---|
| 3e | 50 + 30 + 10 + 10 | Unsplit | 6 m/sec. | 65° C. | 5.0 | 162 |
| 4a | 60 + 20 + 20 | Unsplit | 6 m/sec. | 65° C. | 5.3 | 160 |
| 4b | 50 + 30 + 20 | | | | 5.2 | 162 |
| 4c | 40 + 40 + 20 | | | | 5.4 | 162 |

TABLE 4-continued

| Example | Splitting of the Aluminate Solution in % Portions | Splitting of the Silicate Solution in % Portions | Peripheral Agitator Velocity | Precipitation Temperature | Average Particle Size in μ | CaBC |
|---|---|---|---|---|---|---|
| 4d | 60 + 20 + 10 + 10 | Unsplit | 6 m/sec. | 65° C. | 5.2 | 168 |
| 4e | 40 + 30 + 20 + 10 | | | | 5.2 | 160 |
| 4f | 50 + 30 + 10 + 10 | Unsplit | 4 m/sec. | 65° C. | 6.6 | 152 |
| 4g | 50 + 30 + 10 + 10 | | | 80° C. | 4.9 | 151 |
| 4h | Unsplit | 50 + 30 + 10 + 10 | 6 m/sec. | 65° C. | 6.3 | 150 |
| 4i | | 40 + 30 + 20 + 10 | | 65° C. | 6.0 | 150 |
| 4k | | 40 + 40 + 20 | | 50° C. | 6.0 | 152 |

EXAMPLES 5 AND 6

An agitator column with a capacity of approximately 200 liters and 23 separating trays (corresponding to 24 chambers) was used for the following examples, see FIG. 7. The ratio of the individual chamber height to the column diameter was 0.44. The trays had concentric openings with a diameter of 0.5×column diameter; the round plates, located above at a distance of about 1 mm, had a respective diameter of 0.7×column diameter. The agitator shaft 32 with the agitators for each chamber (MIG-agitator, company EKATO, agitator diameter 0.7×column diameter) had bearings at the ends of the column. The agitator speed was infinitely variable up to a peripheral velocity of 8 m per second.

The components were pumped directly from large stock tanks 11 and 12, after preheating to precipitation temperature, through separately calibrated dosing devices 13 and 14 (rotameters) into the chambers of the agitator column described in more detail in the examples.

An experimental procedure suitable for the splitting of one of the components into up to four partial streams can be found in the simplified flow diagram according to FIG. 7.

EXAMPLES 5a TO 5k

In these examples, only the concentration and dosings of the utilized sodium aluminate and sodium silicate solutions were varied, while the other precipitation conditions were retained. The precipitations were carried out with the agitators rotating at the peripheral velocity of 6 meters per second. The solutions were preheated to 65° C. prior to dosing. The jacketed agitator column was also warmed to a constant 65° C. The aluminate solutions were prepared from moist hydrargillite.

The silicate solution (without splitting into partial streams) was pumped continuously into chamber 28 of the agitator column at the concentrations and doses given in Table 5. The aluminate solution was split into four partial streams. One stream with 50% of the total throughput required according to Table 5 was fed continuously into chamber 28, one stream of 30% of the total throughput, into chamber 29, and two streams of 10% each of the total throughput, into chambers 30 and 31 of the agitator column.

The amorphous reaction mixture leaving the agitator column continuously had a temperature of 65° to 67° C. was always homogeneous and had good fluidity. The granule proportions larger than 50μ were below 1% by weight. The products obtained from it after 40 minutes of crystallization were identified in all cases as highly crystalline, molecular sieve NaA still containing bound water with a chemical composition corresponding to molar ratios of:

1.0 Na$_2$O:1.0 Al$_2$O$_3$:1.8–2.0 SiO$_2$.

The calcium-binding capacity was above 160 mg CaO/gm active substance. All products had an average particle size of less than 7μ and granule size proportions below 10μ exceeding 95% by volume. The wet screening residue according to Mocker was less than 1% by weight.

The following Table 5 gives examples with different total molar ratios in the precipitation batch and variations of the total throughput (precipitation at 65° C., peripheral agitator velocity 6 m/second, splitting of the aluminate component corresponding to 50%+30%+10%+10%, respectively).

TABLE 5

| | Aluminate Solution | | | Silicate Solution | | | Total Molar Ratios in the Precipitation Bath Based on Al$_2$O$_3$ = 1 | | | Total Throughput | Average Particle |
|---|---|---|---|---|---|---|---|---|---|---|---|
| Example | % Al$_2$O$_3$ | % Na$_2$O | Dosing kg/hr | % SiO$_2$ | % Na$_2$O | Dosing kg/hr | Na$_2$O : | SiO$_2$ : | H$_2$O | kg/hr | Size in μ |
| 5a | 12.92 | 14.06 | 1185 | 12.35 | 7.85 | 947 | 2.6 | 1.3 | 60 | 2132 | 5.4 |
| 5b | 12.92 | 14.06 | 1422 | 12.35 | 7.85 | 1138 | 2.6 | 1.3 | 60 | 2560 | 5.9 |
| 5c | 12.92 | 14.06 | 790 | 13.11 | 12.19 | 916 | 3.6 | 2.0 | 70 | 1706 | 5.5 |
| 5d | 12.92 | 14.06 | 1185 | 13.11 | 12.19 | 1375 | 3.6 | 2.0 | 70 | 2560 | 5.2 |
| 5e | 12.43 | 17.38 | 819 | 10.26 | 7.66 | 1050 | 3.6 | 1.8 | 80 | 1869 | 4.4 |
| 5f | 12.43 | 17.38 | 1092 | 10.26 | 7.66 | 1400 | 3.6 | 1.8 | 80 | 2492 | 4.7 |
| 5g | 10.12 | 18.45 | 1008 | 6.36 | 8.77 | 1698 | 5.4 | 1.8 | 120 | 2706 | 3.9 |
| 5h | 12.43 | 17.38 | 1232 | 16.17 | 8.36 | 1002 | 3.2 | 1.8 | 60 | 2234 | 5.7 |
| 5i | 10.12 | 18.45 | 1176 | 8.47 | 6.81 | 1488 | 4.4 | 1.8 | 100 | 2664 | 4.0 |
| 5k | 10.12 | 18.45 | 672 | 8.47 | 6.81 | 850 | 4.4 | 1.8 | 100 | 1522 | 4.2 |

EXAMPLES 6a TO 6k

In these examples, the batch and concentration conditions during the precipitation were kept constant, while the splitting of one of the two components into partial streams, the agitator speed as well as the temperature were varied. The aluminate solution and the silicate solution were dosed accordingly to Example 5e, thus with a total of 819 kg of aluminate solution (12.43% Al$_2$O$_3$ and 17.38% Na$_2$O) per hour as well as a total of 1,050 kg of silicate solution (10.26% SiO$_2$ and 7.66%

Na$_2$O) per hour. From this resulted a total molar ratio of:

$$3.6 \text{ Na}_2\text{O}:1.0 \text{ Al}_2\text{O}_3:1.8 \text{ SiO}_2:80 \text{ H}_2\text{O}$$

in the precipitation batch. The aluminate solution was prepared from technical grade sodium meta-aluminate.

The splitting of the component (aluminate solution or silicate solution) into partial streams of different size, the adjustment of the agitator speed as well as the temperature of the components can be found in the data in Table 6.

The amorphous reaction mixture leaving the agitator column continuously had a temperature corresponding to the precipitation temperature, was always homogeneous and had good fluidity. The granule proportions larger than 50μ were below 1% by weight.

The products obtained after 40 minutes of crystallization were identified in all cases as highly crystalline molecular sieve NaA still containing bound water and having a chemical composition corresponding to molar ratios of:

$$1.0 \text{ Na}_2\text{O} \cdot 1.0 \text{ Al}_2\text{O}_3 \cdot 1.8 \text{ SiO}_2.$$

The calcium-binding capacity was at or above 155 mg CaO/gm AS. All products had an average particle size of less than 7μ and granule size proportions smaller than 10μ exceeding 95% by volume. The wet screening residue according to Mocker has less than 1% by weight.

The hexahedral crystallites had mainly rounded edges and a length of 0.5 to 3 μm for the edges.

The following Table 6 gives examples with different splitting of the components and variations of the agitator speed and precipitation temperature (dosing and molar ratios in the total batch corresponding to Example 5e, see Table 5).

20° to 103° C., where the solutions being mixed have a mathematical total molar ratio of:

$$1.5 \text{ to } 9 \text{ Na}_2\text{O}:1 \text{ Al}_2\text{O}_3:1 \text{ to } 7 \text{ SiO}_2:40 \text{ to } 400 \text{ H}_2\text{O}$$

consisting essentially of the steps of continuously passing one of said two aqueous solutions into the first zone of a progressively, separately zoned mixing area, continuously splitting the other aqueous solution into at least three partial streams, continuously passing the first of said partial streams into said first zone, continuously passing the mixed contents of said first zone into the second zone of a progressively, separately zoned mixing area, continuously passing the remainder of said partial streams separately into downstream zones of said progressively, separately zoned mixing area, where said mean holding time of the reaction mixture in each of said separately zoned mixing areas is at least 5 seconds and sufficient to effect substantial mixing of said contents.

2. The process of claim 1 wherein said first of said partial streams contain from 40% to 60% of the total amount of said split other aqueous solution.

3. The process of claim 2 wherein the remainder of the total amounts of said split other aqueous solution is split into from two to four partial streams, streams two to four, where stream two is equal or greater in amount than streams three and four.

4. The process of claims 1 wherein said split other aqueous solution is said aqueous sodium aluminate solution.

5. The process of claim 2 wherein said split other aqueous solution is said aqueous sodium aluminate solution.

6. The process of claim 3 wherein said split other aqueous solution is said aqueous sodium aluminate solution.

7. The process of claims 1, 2, 3, 4, 5 or 6 wherein said

TABLE 6

| Example | Splitting of the Aluminate Solution in % Portions | Splitting of the Silicate Solution in % Portions | Peripheral Agitator Velocity | Precipitation Temperature | Average Particle Size in μ | CaBC |
|---------|---------------------------------------------------|-------------------------------------------------|------------------------------|---------------------------|---------------------------|------|
| 5e | 50 + 30 + 10 + 10 | Unsplit | 6 m/sec. | 65° C. | 4.4 | 168 |
| 6a | 60 + 20 + 20 | | | | 4.7 | 162 |
| 6b | 50 + 30 + 20 | Unsplit | 6 m/sec. | 65° C. | 4.6 | 165 |
| 6c | 40 + 40 + 20 | | | | 4.7 | 165 |
| 6d | 60 + 20 + 10 + 10 | Unsplit | 6 m/sec. | 65° C. | 4.6 | 170 |
| 6e | 40 + 30 + 20 + 10 | | | | 4.5 | 160 |
| 6f | 50 + 30 + 10 + 10 | Unsplit | 4 m/sec. | 65° C. | 6.0 | 155 |
| 6g | 50 + 30 + 10 + 10 | | | 80° C. | 4.2 | 155 |
| 6h | Unsplit | 50 + 30 + 10 + 10 | 6 m/sec. | 65° C. | 5.7 | 155 |
| 6i | | 40 + 30 + 20 + 10 | | 65° C. | 5.2 | 158 |
| 6k | | 40 + 40 + 20 | | 50° C. | 5.2 | 160 |

The preceding specific embodiments are illustrative of the practice of the invention. It is to be understood, however, that other expedients known to those skilled in the art or described herein, may be employed without departing from the spirit of the invention or the scope of the appended claims.

We claim

1. A process for the continuous production of an aqueous, alkaline suspension of x-ray amorphous sodium aluminosilicate having a small particle size of at least 99% by volume of a particle size of less than 50μ, suitable for conversion into zeolite sodium aluminosilicate of the smallest particle sizes, by mixing an aqueous sodium aluminate solution with an aqueous sodium silicate solution in the presence of excess sodium hydroxide solution at a temperature in the range of from temperature is maintained constant within ±2° C. at a range of from 50° C. to 80° C.

8. The process of claim 1 wherein the total amount of said aqueous sodium aluminate solution and said aqueous sodium silicate solution in the presence of excess sodium hydroxide solution is introduced into said progressively separately zoned mixing area at an overall rate of from 3 to 30 m$^3$ of solution per cubic meter of mixing area per hour and mean holding time in said mixing area is from 2 to 20 minutes.

9. The process of claims 1, 2, 3, 4, 5 or 6 wherein the total amount of said aqueous sodium aluminate solution and said aqueous sodium silicate solution in the presence of excess sodium hydroxide solution is introduced into said progressively separately zoned mixing area at an overall rate of from 4 to 30 m³ of solution per cubic meter of mixing area per hour and mean holding time in said mixing area is from 2 to 15 minutes.

10. The process of claim 1 wherein said progressively, separately, zoned mixing area consists of a series of agitated tanks connected in cascade, the number of said tanks equaling or exceeding the number of said partial streams.

11. The process of claim 1 wherein said progressively, separately zoned mixing area consists of a horizontal mixing area separated by vertical walls into different chambers, the number of separate chambers equalling or exceeding the number of said partial streams.

12. The process of claim 1 wherein said progressively, separately zoned mixing area consists of an agitated vertical column divided by trays into separated agitated chambers, the number of separate chambers equalling or exceeding the number of said partial streams.

* * * * *